(12) United States Patent
Becerra et al.

(10) Patent No.: US 12,296,228 B1
(45) Date of Patent: *May 13, 2025

(54) USE OF AN IMPACT MODIFIER IN A LOW COMPRESSION GOLF BALL

(71) Applicant: Topgolf Callaway Brands Corp., Carlsbad, CA (US)

(72) Inventors: Armando Becerra, Vista, CA (US); Carl Brown, Temecula, CA (US); David Bartels, Carlsbad, CA (US); Vijay Chavan, Oceanside, CA (US)

(73) Assignee: Topgolf Callaway Brands Corp., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/593,094

(22) Filed: Mar. 1, 2024

Related U.S. Application Data

(63) Continuation of application No. 18/122,557, filed on Mar. 16, 2023, now Pat. No. 11,918,860.

(51) Int. Cl.
| | |
|---|---|
| *A63B 37/06* | (2006.01) |
| *A63B 37/00* | (2006.01) |
| *C01B 32/182* | (2017.01) |
| *C08F 36/06* | (2006.01) |
| *C08K 3/04* | (2006.01) |

(52) U.S. Cl.
CPC ...... *A63B 37/0051* (2013.01); *A63B 37/0031* (2013.01); *A63B 37/0033* (2013.01); *A63B 37/0039* (2013.01); *A63B 37/0043* (2013.01); *A63B 37/0045* (2013.01); *A63B 37/0065* (2013.01); *A63B 37/0069* (2013.01); *A63B 37/0074* (2013.01); *A63B 37/0075* (2013.01); *A63B 37/0076* (2013.01); *A63B 37/0078* (2013.01); *A63B 37/0092* (2013.01); *A63B 37/00922* (2020.08); *C01B 32/182* (2017.08); *C08F 36/06* (2013.01); *C08K 3/042* (2017.05)

(58) Field of Classification Search
CPC .................. A63B 37/0051; A63B 37/0039
See application file for complete search history.

(56) References Cited

U.S. PATENT DOCUMENTS

| | | | | |
|---|---|---|---|---|
| 6,117,025 | A * | 9/2000 | Sullivan ................. | C08L 23/08 473/376 |
| 11,607,588 | B1 * | 3/2023 | Becerra .............. | A63B 37/0069 |
| 11,918,860 | B1 * | 3/2024 | Becerra ................. | C08K 3/042 |

* cited by examiner

*Primary Examiner* — Raeann Gorden
(74) *Attorney, Agent, or Firm* — Michael A. Catania

(57) ABSTRACT

A golf ball with improved durability is disclosed herein. The golf ball has a core comprising a polybutadiene material and methyl methacrylate, butadiene, styrene (MBS) with a weight percentage of MBS ranging from 0.5 to 5 weight percent of the core.

1 Claim, 11 Drawing Sheets

USE OF AN IMPACT MODIFIER IN A LOW COMPRESSION GOLF BALL

CROSS REFERENCES TO RELATED APPLICATIONS

The Present Application is a continuation application of U.S. patent application Ser. No. 18/122,557, filed on Mar. 16, 2023, which is a continuation application of U.S. patent application Ser. No. 17/899,340, filed on Aug. 30, 2022, now U.S. Pat. No. 11,607,588, issued on Mar. 21, 2023, which is a continuation application of U.S. patent application Ser. No. 17/144,015, filed on Jan. 7, 2021, now U.S. Pat. No. 11,433,277, issued on Sep. 6, 2022, which is a continuation application of U.S. patent application Ser. No. 16/802,358, filed on Feb. 26, 2020, now U.S. Pat. No. 10,888,739, issued on Jan. 12, 2021, which is a continuation application of U.S. patent application Ser. No. 16/295,841, filed on Mar. 7, 2019, now U.S. Pat. No. 10,625,121, issued on Apr. 21, 2020, which claims priority to U.S. Provisional Patent Application No. 62/641,051, filed Mar. 9, 2018, and U.S. patent application Ser. No. 16/295,841 is a continuation-in-part application of U.S. patent application Ser. No. 16/164,661, filed Oct. 18, 2018, now U.S. Pat. No. 10,252,114, issued on Apr. 9, 2019, which is a continuation-in-part application of U.S. patent application Ser. No. 16/054,703, filed on Aug. 3, 2018, now U.S. Pat. No. 10,279,219, issued on May 7, 2019, which is a continuation application of U.S. patent application Ser. No. 15/705,011, filed on Sep. 14, 2017, now U.S. Pat. No. 10,039,959, issued on Aug. 7, 2018, which is a continuation-in-part application of U.S. patent application Ser. No. 15/436,169, filed on Feb. 17, 2017, now U.S. Pat. No. 9,789,366, issued on Oct. 17, 2017, which claims priority to U.S. Provisional Patent Application No. 62/401,034, filed on Sep. 28, 2016, and the present application claims priority to U.S. Provisional Patent Application No. 62/693,220, filed on Jul. 2, 2018,and U.S. Provisional Patent Application No. 62/695,645, filed on Jul. 9, 2018, each of which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention generally relates to the use of impact modifiers for improved durability of golf balls.

Description of the Related Art

Impact Modifiers are key additives for increasing flexibility and impact strength to meet physical properties of composite materials. Impact modifiers compensate for inherent brittleness, or embrittlement occurring at low temperatures, notch sensitivity and crack propagation.

In the design of a golf ball having a dual core with both layers consisting of a polybutadiene rubber composition, a softer inner core covered by a firmer compression outer core can exhibit poor crack durability when impacted at high speeds. Additionally, a ball having a very soft, low compression single piece polybutadiene core can exhibit poor durability properties also.

Impact property modification of thermoplastic polymers by a variety of rubbers, elastomers, and rubbers combined with the thermoplastics has been known for many years. Extensive interest has been shown for at least 30 years in rubbers combined with thermoplastics in a core-shell structure, typically prepared by emulsion polymerization, as exemplified by such commercial combinations as acrylonitrile-butadiene-styrene polymer (ABS) or methyl methacrylate-butadiene-styrene polymer (MBS) impact-property modifiers for poly(vinyl chloride), acrylic/methacrylic core-shell modifiers for polycarbonate, and the like.

Rubber impact modifiers have been used in the past to improve toughness of plastics. These impact modifiers absorb part of impact energy and prevent further crack propagation in plastics.

The prior art fails to even recognize this problem.

BRIEF SUMMARY OF THE INVENTION

In this invention, we disclose use of core-shell type rubber impact modifier for toughening golf balls cores with low compression. Central part of these impact modifiers is made from crosslinked polybutadiene or styrene butadiene rubber. Shell of these modifiers is made from polymers such as polymethylmethacrylate. They range in diameter from few nanometers to few microns.

The aim of this invention is to improve durability of golf ball cores using polymer based impact modifiers. These impact modifiers are core-shell type in structure and range in few nanometers to few microns in diameters. Compression values of these cores range from −40 to 60 based on the formula: Compression=180−(deflection *1000). Deflection in inches is measured by applying a 200 pound load to the core.

The primary goal of this invention is to improve durability and impact strength of a golf ball by incorporating a copolymer of methyl methacrylate, butadiene, and styrene (MBS) in the mantle. These polymers are core shell type with styrene butadiene polymer core and polymethyl methacrylate shell. MBS polymers are sold by Dow Chemical Company under the tradename Paraloid. The terms Paraloid Impact Modifier and MBS are used interchangeably herein. A benefit of adding MBS to a mantle of a golf ball is seen in either a ball designed to have a low compression single piece core, or a dual core with an outer core firmer than the inner core. Improved durability of the golf ball by using MBS in mantle results in higher mean time to fail (MTTF) upon repeated impact in a high speed testing device, or with a golf club in normal play.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Four different types of cores were made using ingredients mentioned in Table 1 below. Core shell type rubber particles were used as impact modifiers. These particles are commercially available from suppliers such as Dow Chemicals, LG Chem, and Arkema.

5 The MBS polymers are sold by Dow Chemical Company under the tradename Paraloid. The terms Paraloid Impact Modifier and MBS will be used interchangeably in this patent. The primary benefits of adding MBS to core of a golf ball include use of a low compression single piece core, or a dual core with an outer core firmer than the inner core, and improved durability of the golf ball by using MBS in core.

TABLE 1

Recipe and properties of core

|  | Control | 0.5% Impact modifier | 1.5% Impact modifier | 2.5% Impact modifier |
| --- | --- | --- | --- | --- |
| Polybutadiene | 67.8 | 67.5 | 66.8 | 66.1 |
| Zinc Diacrylate | 16.3 | 16.2 | 16.0 | 15.9 |
| Zinc Oxide | 6.8 | 6.7 | 6.7 | 6.6 |
| Zinc Stearate | 0.0 | 0.0 | 0.0 | 0.0 |
| O. Peroxide | 0.5 | 0.5 | 0.5 | 0.5 |
| Zinc pentachlorothiophenol-ZnPCTP (Penta) | 0.6 | 0.6 | 0.6 | 0.6 |
| Color | 0.1 | 0.1 | 0.1 | 0.1 |
| Limestone | 0.0 | 0.0 | 0.0 | 0.0 |
| BaSO4 | 7.9 | 7.9 | 7.8 | 7.7 |
| Impact modifier | 0.0 | 0.5 | 1.5 | 2.5 |
| Total | 100.00 | 100.00 | 100.00 | 100.00 |
| Physical Properties | | | | |
| Compression | 4.6 | 9.2 | 11.8 | 12.9 |
| COR | 0.778 | 0.776 | 0.772 | 0.768 |
| Mean time to fail (MTTF) | 22 | 63 | 61 | 65 |

Cores were made by compression molding precut slugs of above mixture. Curing of the core was done at temperatures ranging between 150-400 F for times ranging from 1-30 minutes. After molding, cores were spherically ground to approximately 1.591" prior to testing. Compression was measured by applying a 200 pound load to the core and measuring its deflection, in inches. Compression=180−(deflection *1000).

Figure 1:
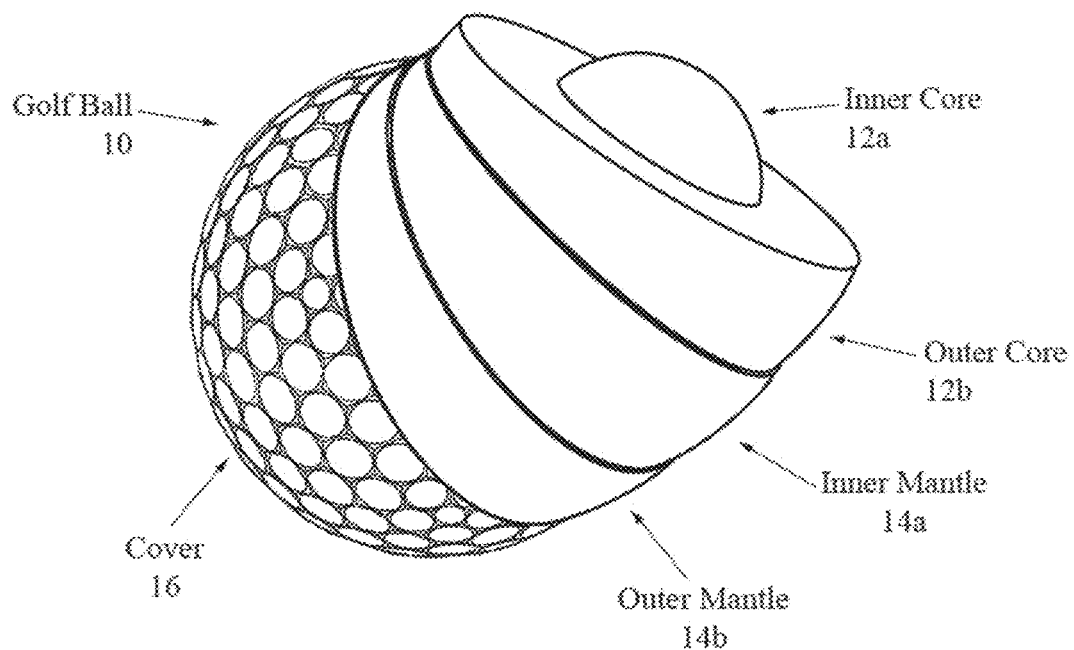
FIG. 1 is an exploded partial cut-away view of a golf ball.
Figure 2:
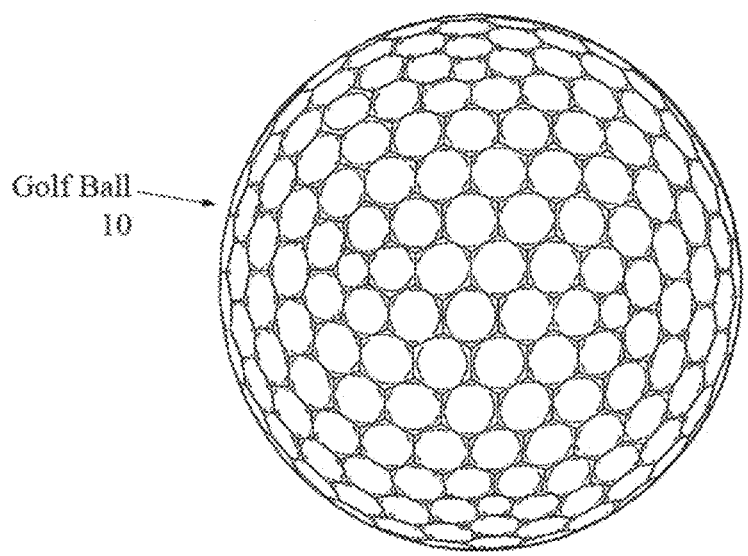
FIG. 2 is top perspective view of a golf ball.
Figure 3:
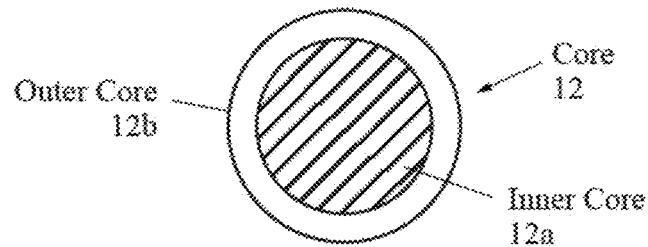
FIG. 3 is a cross-sectional view of a core component of a golf ball.
Figure 4:
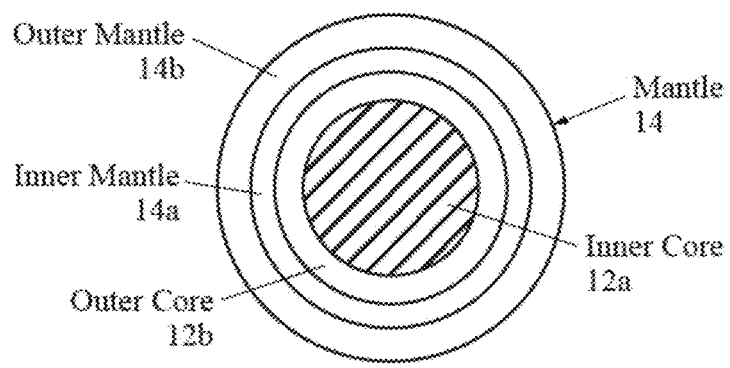
FIG. 4 is a cross-sectional view of a core component and a mantle component of a golf ball.

Durability testing of solid cores. Cores were shot at 150 fps in a pneumatic testing machine (PTM). For each formula mentioned in Table 1, 12 cores were tested. Number of shots after which each core cracked was recorded for each core, and the cracked core was removed from the remainder of the test. The data was reported using a Weibull plot, and the mean time to fail was reported as shown in Table 1. As seen in FIG. 1, impact modifier containing cores endured more shots before failure compared to cores with no impact modifier. It is reasonable to assume that the durability of a golf ball having a single piece core of this design will also experience a dramatic increase in crack durability based on this improvement to the core.

FIGS. 1, 3, 4 and 5 illustrate a five piece golf ball 10 comprising an inner core 12a, an outer core 12b, an inner mantle 14a, an outer mantle 14b, and a cover 16, wherein the outer mantle 14b is composed of a blend of ionomers and methyl methacrylate, butadiene, and styrene (MBS) with a weight percentage of MBS ranging from 5 to 15 weight percent of the mantle layer.

Figure 5:
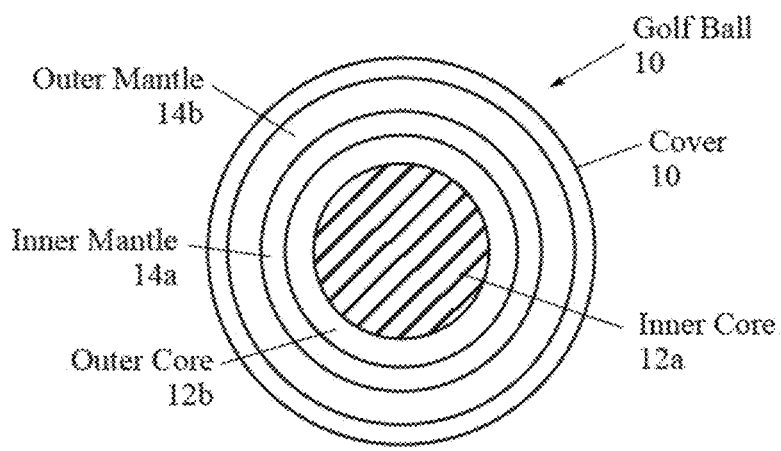
FIG. 5 is a cross-sectional view of an inner core layer, an outer core layer, an inner mantle layer, an outer mantle layer and a cover layer of a golf ball.
Figure 5A:
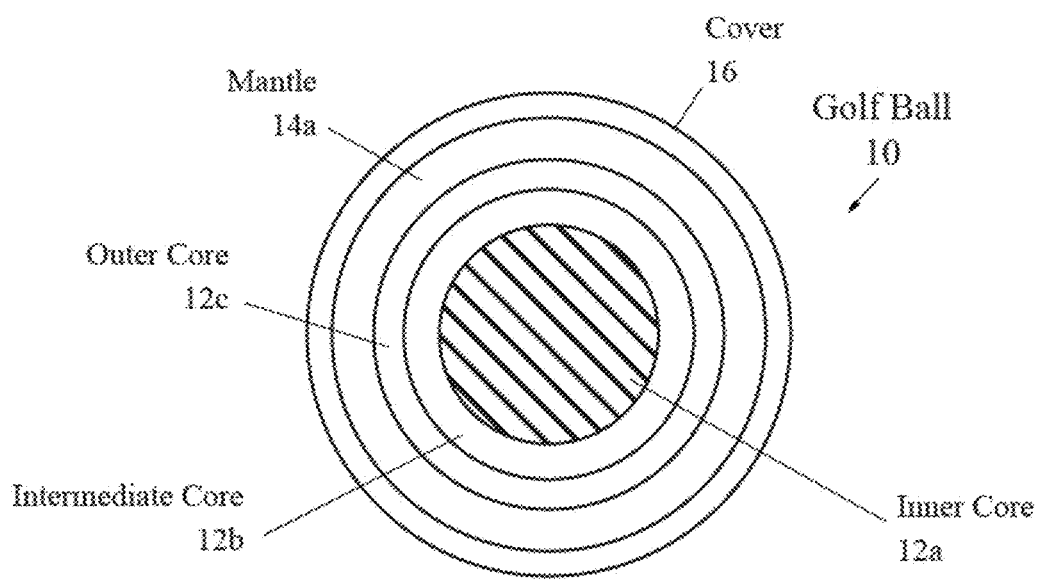
FIG. 5A is a cross-sectional view of an inner core layer, an intermediate core layer, an outer core layer, a mantle layer and a cover layer of a golf ball.

FIG. 5A illustrates a five piece golf ball 10 comprising an inner core 12a, an intermediate core 12b, an outer core 12c, a mantle 14, and a cover 16, wherein the mantle 14 is composed of a blend of ionomers and methyl methacrylate, butadiene, and styrene (MBS) with a weight percentage of MBS ranging from 5 to 15 weight percent of the mantle layer.

Figure 8:
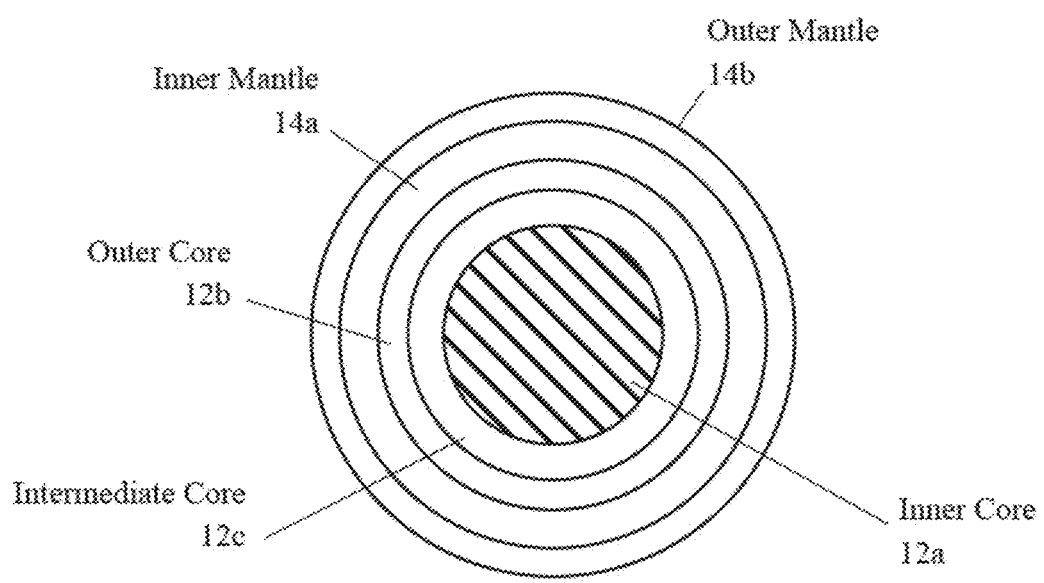
FIG. 8 is a cross-sectional view of a core component and a mantle component of a golf ball.
Figure 9:
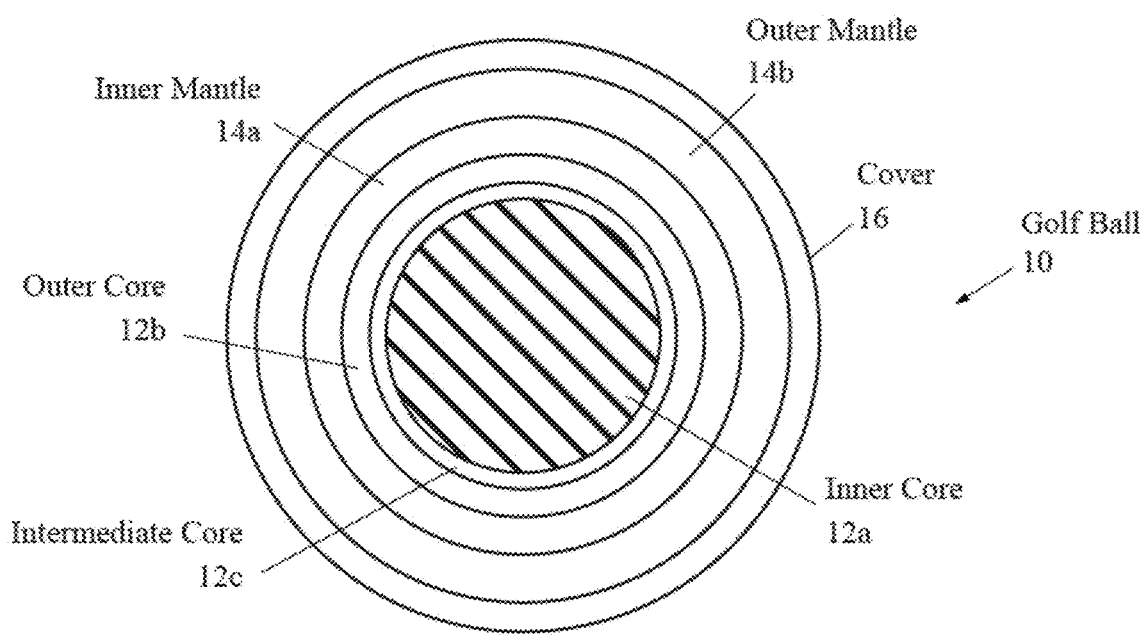
FIG. 9 is a cross-sectional view of a core component, the mantle component and a cover layer of a golf ball.

FIGS. 8 and 9 illustrate a six piece golf ball 10 comprising an inner core 12a, an intermediate core 12b, an outer core 12c, an inner mantle 14a, an outer mantle 14b, and a cover 16, wherein the outer mantle 14b is composed of a blend of ionomers and methyl methacrylate, butadiene, and styrene (MBS) with a weight percentage of MBS ranging from 5 to 15 weight percent of the mantle layer.

Figure 10:
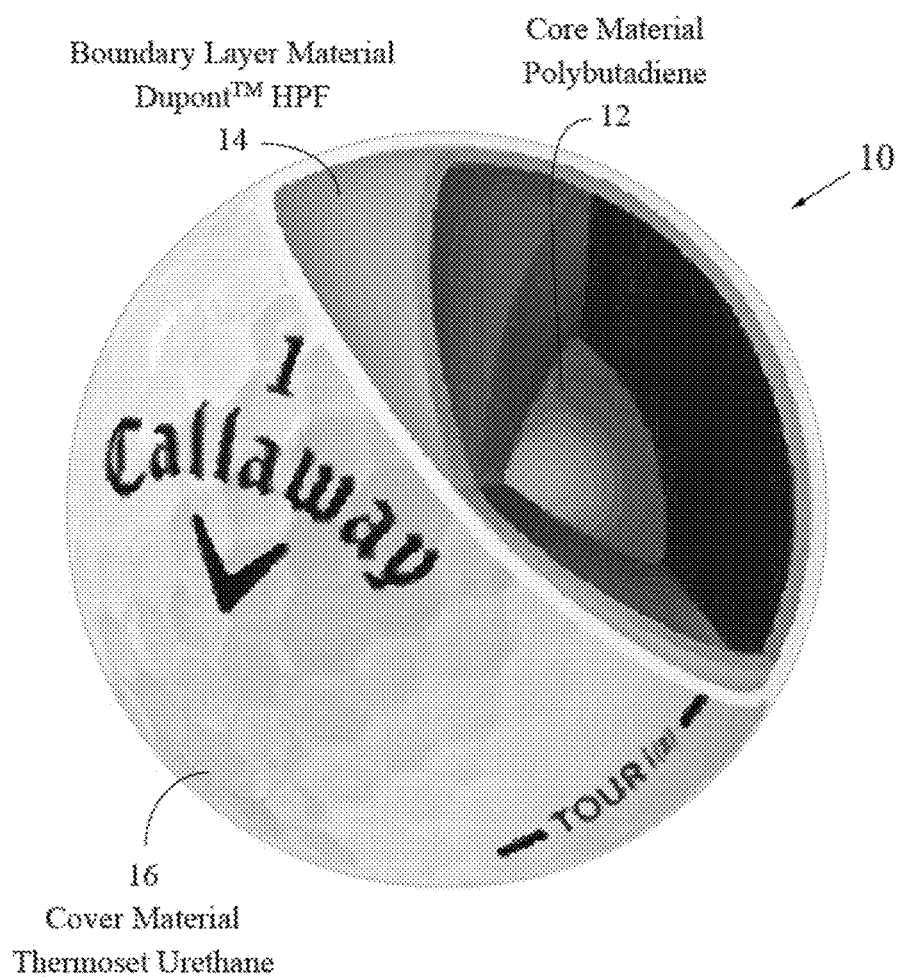
FIG. 10 is an exploded partial cut-away view of a four-piece golf ball.

FIG. 10 illustrates a four-piece golf ball comprising a dual core, a mantle layer and a cover, wherein the outer mantle is composed of a blend of ionomers and methyl methacrylate, butadiene, and styrene (MBS) with a weight percentage of MBS ranging from 5 to 15 weight percent of the mantle layer.

Figure 11:
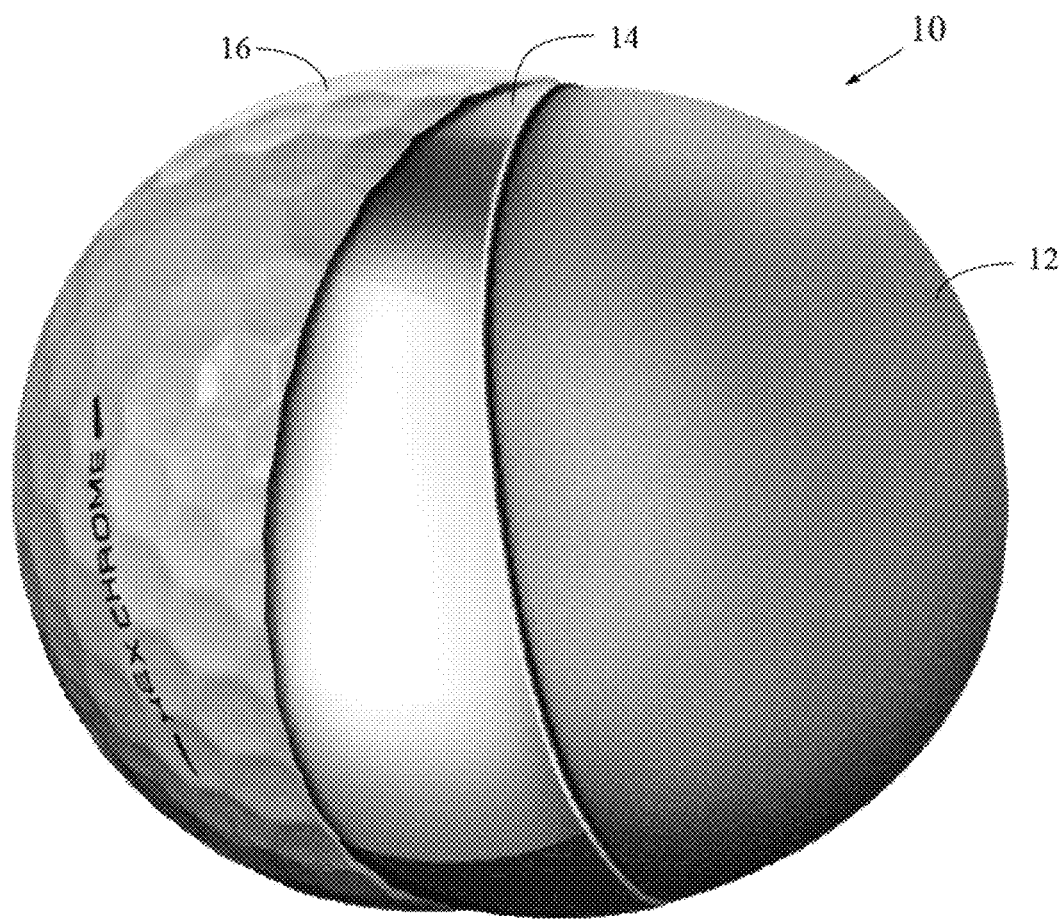
FIG. 11 is an exploded partial cut-away view of a three-piece golf ball.

FIG. 11 illustrates a three piece golf ball comprising a core, a mantle layer and a cover, wherein the mantle layer is composed of a blend of ionomers and methyl methacrylate, butadiene, and styrene (MBS) with a weight percentage of MBS ranging from 5 to 15 weight percent of the mantle layer.

The mantle component is preferably composed of the inner mantle layer and the outer mantle layer. The mantle component preferably has a thickness ranging from 0.05 inch to 0.15 inch, and more preferably from 0.06 inch to 0.08 inch. The outer mantle layer is preferably composed of a blend of ionomers and methyl methacrylate, butadiene, and styrene (MBS) with a weight percentage of MBS ranging from 5 to 15 weight percent of the mantle layer. One preferred embodiment comprises SURLYN 9150 material, SURLYN 8940 material, a SURLYN AD1022 material, and a masterbatch.

SURLYN 8320, from DuPont, is a very-low modulus ethylene/methacrylic acid copolymer with partial neutralization of the acid groups with sodium ions. SURLYN 8945, also from DuPont, is a high acid ethylene/methacrylic acid copolymer with partial neutralization of the acid groups with sodium ions. SURLYN 9945, also from DuPont, is a high acid ethylene/methacrylic acid copolymer with partial neutralization of the acid groups with zinc ions. SURLYN 8940, also from DuPont, is an ethylene/methacrylic acid copolymer with partial neutralization of the acid groups with sodium ions.

The inner mantle layer is preferably composed of a blend of ionomers, preferably comprising a terpolymer and at least two high acid (greater than 18 weight percent) ionomers neutralized with sodium, zinc, magnesium, or other metal ions. The material for the inner mantle layer preferably has a Shore D plaque hardness ranging preferably from 35 to 77, more preferably from 36 to 44, a most preferably approximately 40. The thickness of the outer mantle layer preferably ranges from 0.025 inch to 0.050 inch, and is more preferably approximately 0.037 inch. The mass of an insert including the dual core and the inner mantle layer preferably ranges from 32 grams to 40 grams, more preferably from 34 to 38 grams, and is most preferably approximately 36 grams. The inner mantle layer is alternatively composed of a HPF material available from DuPont. Alternatively, the inner mantle layer 14b is composed of a material such as disclosed in Kennedy, III et al., U.S. Pat. No. 7,361,101 for a Golf Ball And Thermoplastic Material, which is hereby incorporated by reference in its entirety.

The outer mantle layer is preferably composed of a blend of ionomers and methyl methacrylate, butadiene, and styrene (MBS) with a weight percentage of MBS ranging from 5 to 15 weight percent of the mantle layer. The blend also preferably includes a masterbatch. The material of the outer mantle layer preferably has a Shore D plaque hardness ranging preferably from 55 to 75, more preferably from 65 to 71, and most preferably approximately 67. The thickness of the outer mantle layer preferably ranges from 0.025 inch to 0.040 inch, and is more preferably approximately 0.030 inch. The mass of the entire insert including the core, the inner mantle layer and the outer mantle layer preferably ranges from 38 grams to 43 grams, more preferably from 39 to 41 grams, and is most preferably approximately 41 grams.

In an alternative embodiment, the inner mantle layer is preferably composed of a blend of ionomers, preferably comprising at least two high acid (greater than 18 weight percent) ionomers neutralized with sodium, zinc, or other metal ions. The blend of ionomers also preferably includes a masterbatch. In this embodiment, the material of the inner mantle layer has a Shore D plaque hardness ranging preferably from 55 to 75, more preferably from 65 to 71, and most preferably approximately 67. The thickness of the outer mantle layer preferably ranges from 0.025 inch to 0.040 inch, and is more preferably approximately 0.030 inch. Also in this embodiment, the outer mantle layer is preferably composed of a blend of ionomers and methyl methacrylate, butadiene, and styrene (MBS) with a weight percentage of MBS ranging from 5 to 15 weight percent of the mantle layer. In this embodiment, the material for the outer mantle layer 14b preferably has a Shore D plaque hardness ranging preferably from 35 to 77, more preferably from 36 to 44, a most preferably approximately 40. The thickness of the outer mantle layer preferably ranges from 0.025 inch to 0.100 inch, and more preferably ranges from 0.070 inch to 0.090 inch.

In yet another embodiment wherein the inner mantle layer is thicker than the outer mantle layer and the outer mantle layer is harder than the inner mantle layer, the inner mantle layer is composed of a blend of ionomers, preferably comprising a terpolymer and at least two high acid (greater than 18 weight percent) ionomers neutralized with sodium, zinc, magnesium, or other metal ions. In this embodiment, the material for the inner mantle layer has a Shore D plaque hardness ranging preferably from 30 to 77, more preferably from 30 to 50, and most preferably approximately 40. In this embodiment, the material for the outer mantle layer has a Shore D plaque hardness ranging preferably from 40 to 77, more preferably from 50 to 71, and most preferably approximately 67. In this embodiment, the thickness of the inner mantle layer preferably ranges from 0.030 inch to 0.090 inch, and the thickness of the outer mantle layer ranges from 0.025 inch to 0.070 inch.

Preferably the inner core has a diameter ranging from 0.75 inch to 1.20 inches, more preferably from 0.85 inch to 1.05 inch, and most preferably approximately 0.95 inch. Preferably the inner core 12a has a Shore D hardness ranging from 20 to 50, more preferably from 25 to 40, and most preferably approximately 35. Preferably the inner core has a mass ranging from 5 grams to 15 grams, 7 grams to 10 grams and most preferably approximately 8 grams.

Preferably the outer core has a diameter ranging from 1.25 inch to 1.55 inches, more preferably from 1.40 inch to 1.5 inch, and most preferably approximately 1.5 inch. Preferably the outer core has a Shore D surface hardness ranging from 40 to 65, more preferably from 50 to 60, and most preferably approximately 56. Preferably the outer core is formed from a polybutadiene, zinc diacrylate, zinc oxide, zinc stearate, a peptizer and peroxide. Preferably the combined inner core and outer core have a mass ranging from 25 grams to 35 grams, 30 grams to 34 grams and most preferably approximately 32 grams.

Figure 6:
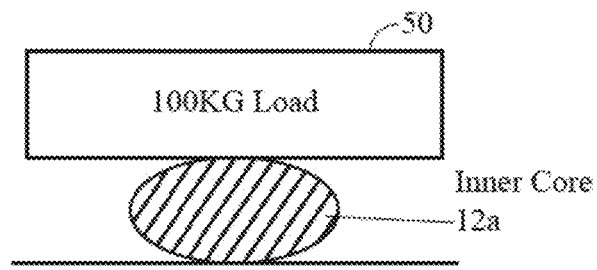
FIG. 6 is a cross-sectional view of an inner core layer under a 100 kilogram load.
Figure 7:
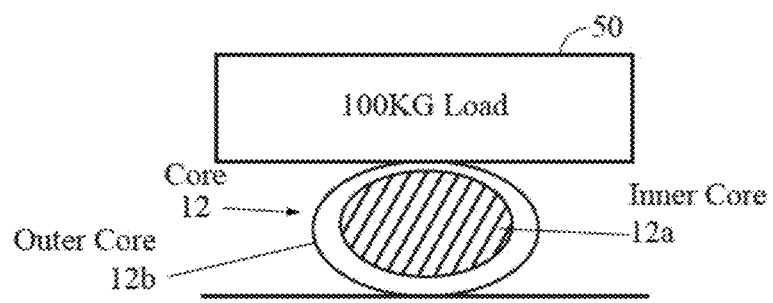
FIG. 7 is a cross-sectional view of a core under a 100 kilogram load.

Preferably the inner core has a deflection of at least 0.230 inch under a load of 220 pounds, and the core has a deflection of at least 0.080 inch under a load of 200 pounds. As shown in FIGS. 6 and 7, a mass 50 is loaded onto an inner core and a core. As shown in FIGS. 6 and 7, the mass is 100 kilograms, approximately 220 pounds. Under a load of 100 kilograms, the inner core preferably has a deflection from 0.230 inch to 0.300 inch. Under a load of 100 kilograms, preferably the core has a deflection of 0.08 inch to 0.150 inch. Alternatively, the load is 200 pounds (approximately 90 kilograms), and the deflection of the core 12 is at least 0.080 inch. Further, a compressive deformation from a beginning load of 10 kilograms to an ending load of 130 kilograms for the inner core ranges from 4 millimeters to 7 millimeters and more preferably from 5 millimeters to 6.5 millimeters. The dual core deflection differential allows for low spin off the tee to provide greater distance, and high spin on approach shots.

In an alternative embodiment of the golf ball shown in FIG. 5A, the golf ball 10 comprises an inner core 12a, an intermediate core 12b, an outer core 12b, a mantle 14 and a cover 16. The golf ball 10 preferably has a diameter of at least 1.68 inches, a mass ranging from 45 grams to 47 grams, a COR of at least 0.79, a deformation under a 100 kilogram loading of at least 0.07 mm.

In one embodiment, the golf ball comprises a core, a mantle layer and a cover layer. The core comprises an inner core sphere, an intermediate core layer and an outer core layer. The inner core sphere has a diameter ranging from 0.875 inch to 1.4 inches. The intermediate core layer is composed of a highly neutralized ionomer and has a Shore D hardness less than 40. The outer core layer is composed of a highly neutralized ionomer and has a Shore D hardness less than 45. A thickness of the intermediate core layer is greater than a thickness of the outer core layer. The mantle layer is disposed over the core, comprises an ionomer material and has a Shore D hardness greater than 55. The cover layer is disposed over the mantle layer comprises a thermoplastic polyurethane material and has a Shore A hardness less than 100. The golf ball has a diameter of at least 1.68 inches. The mantle layer is harder than the outer core layer, the outer core layer is harder than the intermediate core layer, the intermediate core layer is harder than the inner core sphere, and the cover layer is softer than the mantle layer.

In another embodiment, shown in FIGS. 8 and 9, the golf ball 10 has a multi-layer core and multi-layer mantle. The golf ball includes a core, a mantle component and a cover layer. The core comprises an inner core sphere, an intermediate core layer and an outer core layer. The intermediate core layer is composed of a highly neutralized ionomer and has a Shore D hardness less than 40. The outer core layer is composed of a highly neutralized ionomer and has a Shore D hardness less than 45. A thickness of the intermediate core layer is greater than a thickness of the outer core layer 12c. The inner mantle layer is disposed over the core, comprises an ionomer material and has a Shore D hardness greater than 55. The outer mantle layer is disposed over the inner mantle layer, comprises an ionomer material and has a Shore D hardness greater than 60. The cover layer is disposed over the mantle component, comprises a thermoplastic polyurethane material and has a Shore A hardness less than 100. The golf ball has a diameter of at least 1.68 inches. The outer mantle layer is harder than the inner mantle layer, the inner mantle layer is harder than the outer core layer, the outer core layer is harder than the intermediate core layer, the intermediate core layer is harder than the inner core sphere, and the cover layer is softer than the outer mantle layer.

EXAMPLES

Polybutadiene based cores were made using following materials. Corresponding levels (by % wt) is mentioned next to each material: Polybutadiene with more than 60% 1,4-cis structure-(40-900; Polyisoprene-(1-30%); Zinc diacrylate-(10-50%); Zinc oxide-(1-30%); Zinc stearate-(1-20%); Peroxide initiator-(0.1-10%); Zinc pentachlorothiophenol-(0-10%); Color-(0-10%); Barium sulfate-(0-20%).

Dual cores were made by compression molding two outer core halves around an already molded inner core having a diameter of approximately 0.940" and a soft compression of approximately 0.200 inches of deflection under a 200 lb load.

Curing of the outer core was done at temperatures ranging between 150-400 F for times ranging from 1-30 minutes. After molding, the dual cores were spherically ground to approximately 1.554" prior to testing.

Table 1 and 2 give details of recipe of inner and outer cores. Components from these recipes were mixed in an internal mixer. Optionally, additional mixing was done using a two roll mill.

Compression of the outer core is measured by first making a full size core separately, measuring its compression, and then molding two halves around the inner core to complete the dual core. Compression differential describes the difference between the outer core compression (as molded independently) and inner core compression. A higher compression differential is more susceptible to crack durability upon impact.

TABLE ONE

| Inner Core Formula | |
|---|---|
| Components | % wt |
| Polybutadiene rubber | 69.2 |
| Polyisoprene rubber | 0.0 |
| Zinc diacrylate | 14.8 |
| Zinc oxide | 12.2 |
| Zinc stearate | 2.1 |
| Peroxide initiator | 1.0 |
| Zinc pentachlorothiophenol | 0.6 |
| Color | 0.1 |
| Barium sulfate | 0.0 |
| Properties | |
| Compression | 0.222 |

TABLE TWO

| Outer Core Formula | |
|---|---|
| Components | Formula % wt |
| Polybutadiene rubber | 62.6 |
| Polyisoprene rubber | 0.0 |
| Zinc diacrylate | 19.9 |
| Zinc oxide | 6.3 |
| Zinc stearate | 3.8 |
| Peroxide initiator | 0.5 |
| Zinc pentachlorothiophenol | 0.6 |
| Color | 0.3 |
| Barium sulfate | 6.4 |
| Properties of outer core | |
| Compression | |
| COR (coefficient of restitution) | 0.800 |
| Properties of dual core built from inner and outer core | |
| Compression | 47.7 |
| COR (coefficient of restitution @ 125 fps) | 0.789 |

Compression is measured by applying a 200 pound load to the core and measuring its deflection, in inches. Compression=180−(deflection*1000).

Mantles were molded on top of dual cores using injection molding process. Mantles were made of polyethylene ionomers sold under the trade name Surlyn by DuPont. MBS modified surlyn can be made by physically blending mixture of MBS and Surlyn or extruding mixture of MBS and Surlyn. Twin screw can be used for extrusion process. Thickness of mantle can vary from 0.010 to 0.050 inches.

TABLE THREE

| Mantle Layer Formula | | |
|---|---|---|
| Description | Control mantle | Formula 1 |
| Group no | P50813 | P50814 |
| Surlyn 1 (%) | 9 | 8.1 |
| Surlyn 2 (%) | 45.5 | 40.95 |
| Surlyn 3 (%) | 45.5 | 40.95 |
| MBS (%) | 0 | 10 |
| Compression | 64 | 64 |
| COR (coefficient of restitution @ 175 fps) | 0.805 | 0.803 |
| Durability score or mean time to fail MTTF(number of shots after which ball starts to crack/fail) | 22.8 | 42.4 |

Compression is measured by applying a 200 pound load to the core and measuring its deflection, in inches. Compression=180−(deflection*1000).

Durability testing of the mantle layers.

Figure 12:
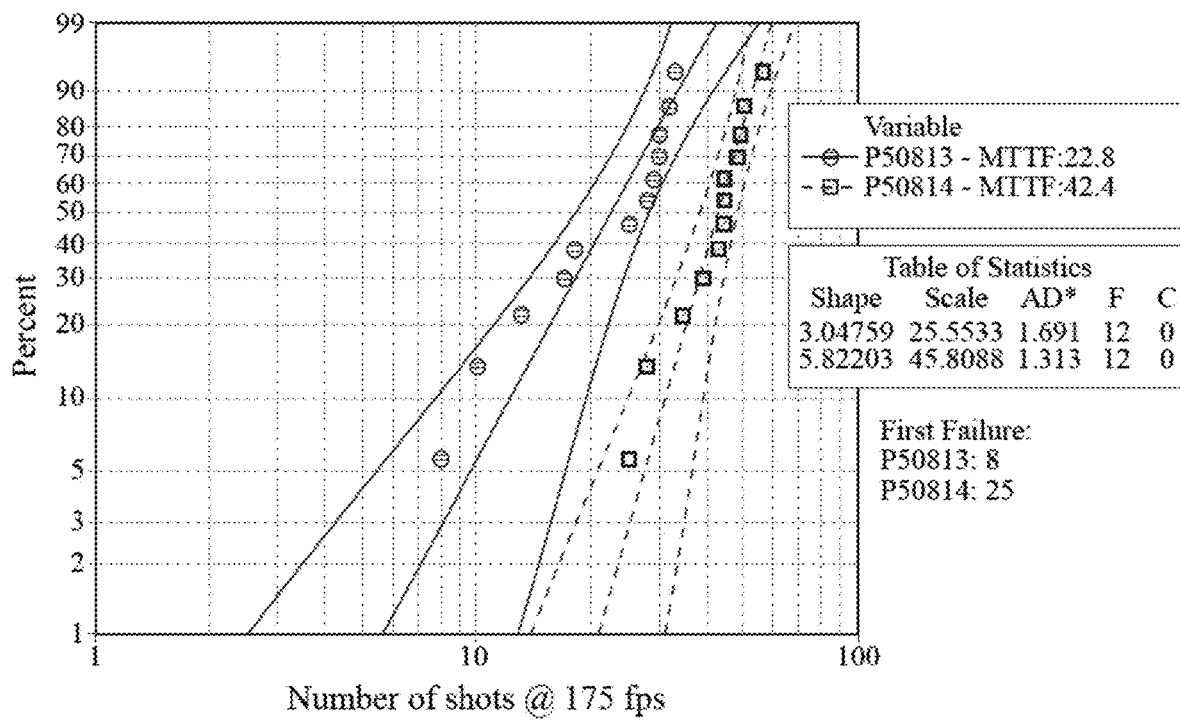
FIG. 12 is a graph of mantle layer cover cores shot at 175 fps in a pneumatic testing machine (PTM).

Mantles were shot at 175 fps in a pneumatic testing machine (PTM). For each formula mentioned in Table 3, 12 mantles were tested. Number of shots after which each core cracked was recorded for each core, and the cracked core was removed from the remainder of the test. The data was reported using a Weibull plot, and the mean time to failure was reported as shown in Table 3. As seen in FIG. 12, MBS modified mantles endured more shots before failure compared to mantles with no MBS. It is reasonable to assume that the durability of a golf ball having a dual core of this design will also experience a dramatic increase in crack durability based on this improvement to the dual core.

Thermoplastic polyurethane (TPU) cover was injection molded on top of mantles. Balls with TPU cover were then painted using polyurethane coatings. Polyurethane coating was heat cured at high temperature for few minutes. Thickness of cover can vary from 0.005 to 0.050 inches.

A mantle layer/outer core/inner core precursor product compression under a load of 200 pounds preferably ranges from 50 to 80, and more preferably ranges from 60 to 70. The mantle layer/outer core/inner core precursor product preferably has a COR of at least 0.8. The mantle layer/outer core/inner core precursor product preferably has a durability score of at least 40.

TABLE FOUR

| Description | Ball | |
|---|---|---|
| | Control Ball | Formula 1 |
| Group no | P49796 | P49800 |
| TPU 1 (%) | 81 | 81 |
| TPU 2 (%) | 9 | 9 |
| Color MB 3 (%) | 10 | 10 |
| MBS in mantle (%) | 0 | 10 |
| Compression | 72.24 | 72.25 |
| COR (coefficient of restitution @ 175 fps) | 0.789 | 0.786 |
| Durability score or mean time to fail MTTF(number of shots after which ball starts to crack/fail) | 19.56 | 63.63 |

Figure 13:
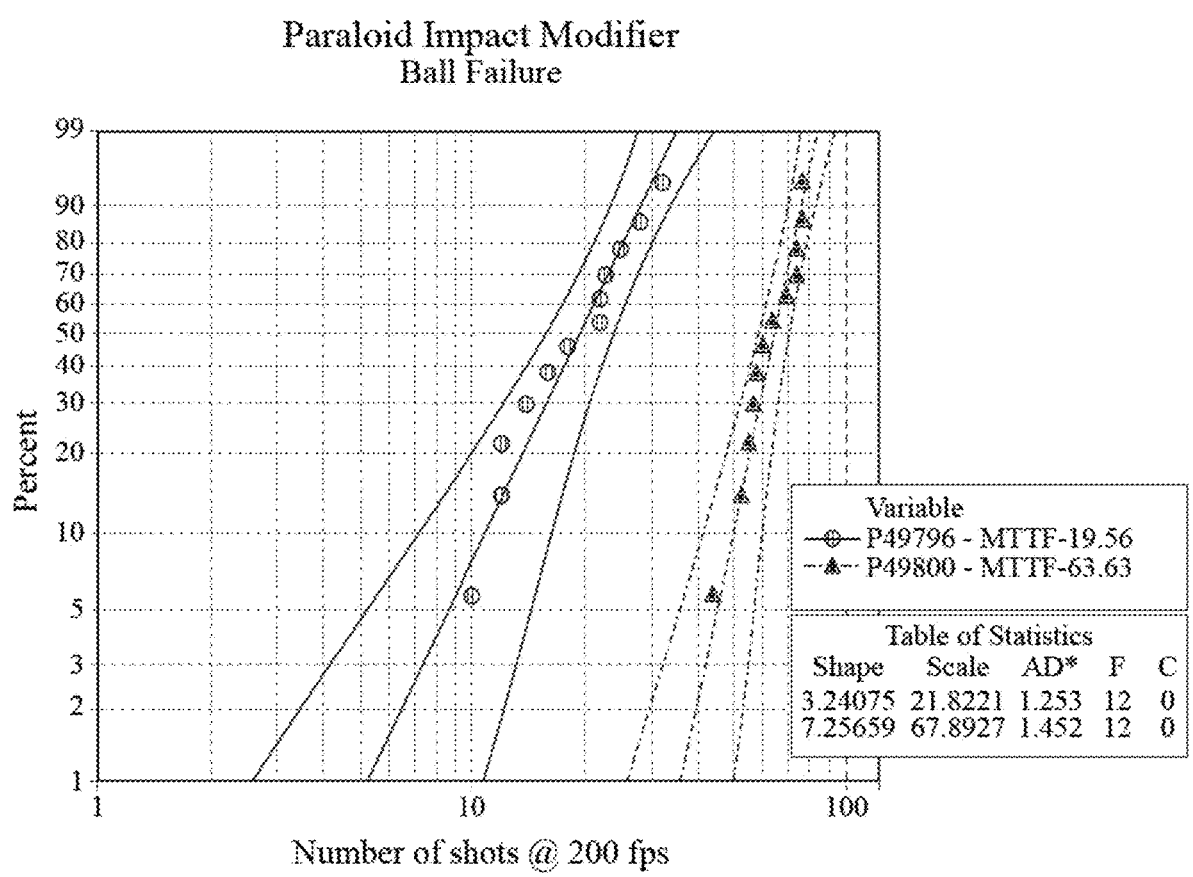
FIG. 13 is a graph of balls were shot at 200 fps in a pneumatic testing machine (PTM).
Figure 14:
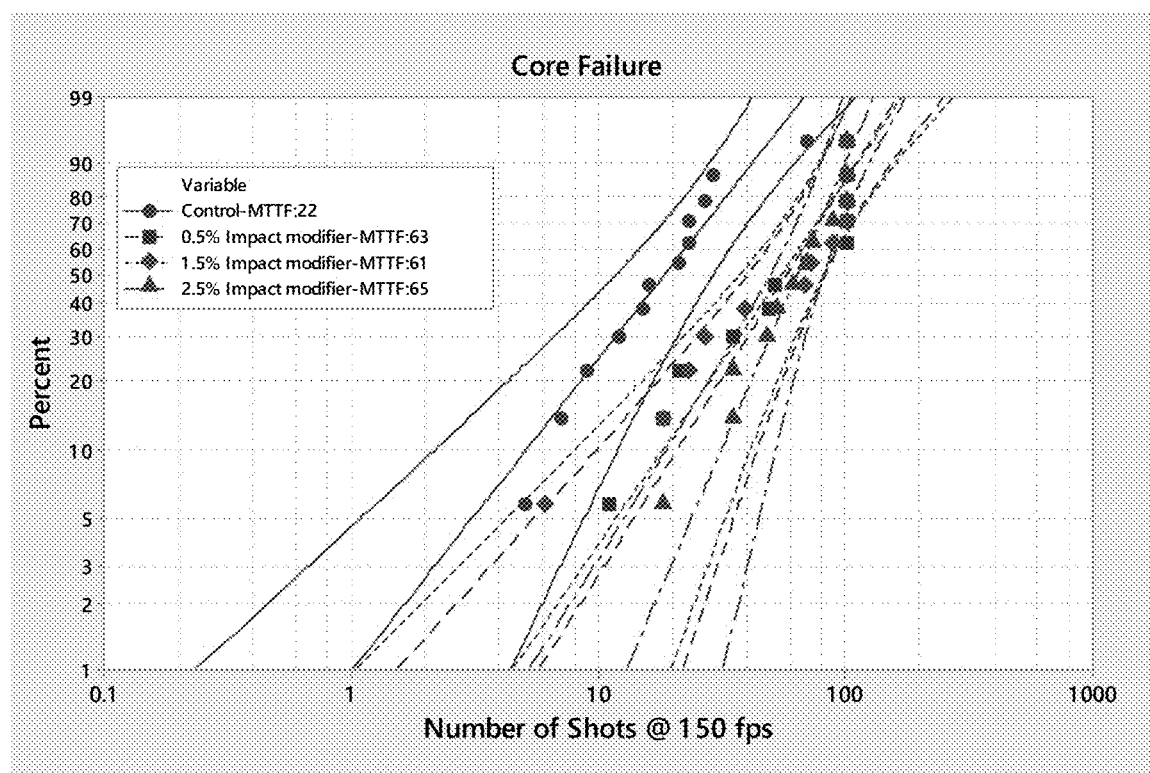
FIG. 14 illustrates durability testing of solid cores using PTM at 150 fps.

Finished balls were shot at 200 fps in a pneumatic testing machine (PTM). For each formula mentioned in Table 4, 12 balls were tested. Number of shots after which each core cracked was recorded for each core, and the cracked core was removed from the remainder of the test. The data was reported using a Weibull plot, and the mean time to failure was reported as shown in Table 4. As seen in FIG. 13, MBS modified balls endured more shots before failure compared to balls with no MBS.

Durability of the dual core with a high compression differential is greatly enhanced by incorporation of MBS in the mantle layer. The MBS reinforcement to the mantle layer helps resist the high stresses experienced by the core when struck at high club speeds.

The addition of MBS to the mantle recipe is very simple and can be dispersed into the Ionomer mixture with a twin screw compounding process.

The MBS mantle is particularly crucial if the single mantle layer has a thickness less than 0.050", or more specifically thinner than 0.040", with 0.036" being the target in this study.

A ball compression under a load of 200 pounds preferably ranges from 60 to 80, and more preferably ranges from 65 to 75. The ball preferably has a COR of at least 0.785. The ball preferably has a durability score of at least 40, more preferably at least 50, and most preferably at least 60.

In a particularly preferred embodiment of the invention, the golf ball preferably has an aerodynamic pattern such as disclosed in Simonds et al., U.S. Pat. No. 7,419,443 for a Low Volume Cover For A Golf Ball, which is hereby incorporated by reference in its entirety. Alternatively, the golf ball has an aerodynamic pattern such as disclosed in Simonds et al., U.S. Pat. No. 7,338,392 for An Aerodynamic Surface Geometry For A Golf Ball, which is hereby incorporated by reference in its entirety.

Various aspects of the present invention golf balls have been described in terms of certain tests or measuring procedures. These are described in greater detail as follows.

As used herein, "Shore D hardness" of the golf ball layers is measured generally in accordance with ASTM D-2240 type D, except the measurements may be made on the curved surface of a component of the golf ball, rather than on a plaque. If measured on the ball, the measurement will indicate that the measurement was made on the ball. In referring to a hardness of a material of a layer of the golf ball, the measurement will be made on a plaque in accordance with ASTM D-2240. Furthermore, the Shore D hardness of the cover is measured while the cover remains over the mantles and cores. When a hardness measurement is made on the golf ball, the Shore D hardness is preferably measured at a land area of the cover.

As used herein, "Shore A hardness" of a cover is measured generally in accordance with ASTM D-2240 type A, except the measurements may be made on the curved surface of a component of the golf ball, rather than on a plaque. If measured on the ball, the measurement will indicate that the measurement was made on the ball. In referring to a hardness of a material of a layer of the golf ball, the measurement will be made on a plaque in accordance with ASTM D-2240. Furthermore, the Shore A hardness of the cover is measured while the cover remains over the mantles and cores. When a hardness measurement is made on the golf ball, Shore A hardness is preferably measured at a land area of the cover The resilience or coefficient of restitution (COR) of a golf ball is the constant "e," which is the ratio of the relative velocity of an elastic sphere after direct impact to that before impact. As a result, the COR ("e") can vary from 0 to 1, with 1 being equivalent to a perfectly or completely elastic collision and 0 being equivalent to a perfectly or completely inelastic collision.

COR, along with additional factors such as club head speed, club head mass, ball weight, ball size and density, spin rate, angle of trajectory and surface configuration as well as environmental conditions (e.g. temperature, moisture, atmospheric pressure, wind, etc.) generally determine the distance a ball will travel when hit. Along this line, the distance a golf ball will travel under controlled environmental conditions is a function of the speed and mass of the club and size, density and resilience (COR) of the ball and other factors. The initial velocity of the club, the mass of the club and the angle of the ball's departure are essentially provided by the golfer upon striking. Since club head speed, club head mass, the angle of trajectory and environmental conditions are not determinants controllable by golf ball producers and the ball size and weight are set by the U.S.G.A., these are not factors of concern among golf ball manufacturers. The factors or determinants of interest with respect to improved distance are generally the COR and the surface configuration of the ball.

The coefficient of restitution is the ratio of the outgoing velocity to the incoming velocity. In the examples of this application, the coefficient of restitution of a golf ball was measured by propelling a ball horizontally at a speed of 125+/−5 feet per second (fps) and corrected to 125 fps against a generally vertical, hard, flat steel plate and measuring the ball's incoming and outgoing velocity electronically. Speeds were measured with a pair of ballistic screens, which provide a timing pulse when an object passes through them. The screens were separated by 36 inches and are located 25.25 inches and 61.25 inches from the rebound wall. The ball speed was measured by timing the pulses from screen 1 to screen 2 on the way into the rebound wall (as the average speed of the ball over 36 inches), and then the exit speed was timed from screen 2 to screen 1 over the same distance. The rebound wall was tilted 2 degrees from a vertical plane to allow the ball to rebound slightly downward in order to miss the edge of the cannon that fired it. The rebound wall is solid steel.

As indicated above, the incoming speed should be 125±5 fps but corrected to 125 fps. The correlation between COR and forward or incoming speed has been studied and a correction has been made over the +5 fps range so that the COR is reported as if the ball had an incoming speed of exactly 125.0 fps.

The measurements for deflection, compression, hardness, and the like are preferably performed on a finished golf ball as opposed to performing the measurement on each layer during manufacturing.

Preferably, in a five layer golf ball comprising an inner core, an outer core, an inner mantle layer, an outer mantle layer and a cover, the hardness/compression of layers involve an inner core with the greatest deflection (lowest hardness), an outer core (combined with the inner core) with a deflection less than the inner core, an inner mantle layer with a hardness less than the hardness of the combined outer core and inner core, an outer mantle layer with the hardness layer of the golf ball, and a cover with a hardness less than the hardness of the outer mantle layer. These measurements are preferably made on a finished golf ball that has been torn down for the measurements.

Preferably the inner mantle layer is thicker than the outer mantle layer or the cover layer. The dual core and dual mantle golf ball creates an optimized velocity-initial velocity ratio (Vi/IV), and allows for spin manipulation. The dual core provides for increased core compression differential resulting in a high spin for short game shots and a low spin for driver shots. A discussion of the USGA initial velocity test is disclosed in Yagley et al., U.S. Pat. No. 6,595,872 for a Golf Ball With High Coefficient Of Restitution, which is hereby incorporated by reference in its entirety. Another example is Bartels et al., U.S. Pat. No. 6,648,775 for a Golf Ball With High Coefficient Of Restitution, which is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim:

1. A golf ball comprising:
a core comprising a polybutadiene material and a methyl methacrylate, butadiene, styrene (MBS);
an inner mantle layer disposed over the core, the inner mantle layer having a thickness ranging from 0.030 inch to 0.090 inch, the inner mantle layer comprising a blend of ionomers and MBS with a weight percentage of MBS ranging from 5 to 15 weight percent of the mantle layer, the mantle layer material having a plaque Shore D hardness ranging from 30 to 50;
an outer mantle disposed over the inner mantle layer; and
a cover layer disposed over the outer mantle layer, the cover layer composed of a polyurethane material;
wherein the golf ball has a compression under a load of 200 pounds ranging from 60 to 80;
wherein the golf ball has a COR of at least 0.785.

* * * * *